United States Patent
Ganesh et al.

(10) Patent No.: US 11,441,628 B2
(45) Date of Patent: Sep. 13, 2022

(54) AIRCRAFT BRAKE COOLING SYSTEMS AND METHODS

(71) Applicant: The Boeing Company, Chicago, IL (US)

(72) Inventors: Prashant Iyer Ganesh, Coimbatore (IN); Harshinder Singh, New Delhi (IN)

(73) Assignee: The Boeing Company, Chicago, IL (US)

( * ) Notice: Subject to any disclaimer, the term of this patent is extended or adjusted under 35 U.S.C. 154(b) by 228 days.

(21) Appl. No.: 16/776,425

(22) Filed: Jan. 29, 2020

(65) Prior Publication Data

US 2021/0231184 A1  Jul. 29, 2021

(51) Int. Cl.
| | |
|---|---|
| *F16D 65/84* | (2006.01) |
| *F16D 65/847* | (2006.01) |
| *B60T 5/00* | (2006.01) |
| *B64C 25/42* | (2006.01) |
| *B64D 27/16* | (2006.01) |
| *B64C 25/44* | (2006.01) |
| *F16D 65/78* | (2006.01) |

(52) U.S. Cl.
CPC .............. *F16D 65/847* (2013.01); *B60T 5/00* (2013.01); *B64C 25/423* (2013.01); *B64C 25/44* (2013.01); *B64D 27/16* (2013.01); *F16D 2065/786* (2013.01)

(58) Field of Classification Search
CPC ...... F16D 65/847; B64C 25/423; B64C 27/16
See application file for complete search history.

(56) References Cited

U.S. PATENT DOCUMENTS

| | | | | |
|---|---|---|---|---|
| 2,552,571 A | * | 5/1951 | Mercier ................. | B64C 25/42 188/264 AA |
| 3,044,736 A | * | 7/1962 | Chambers ............. | F16D 65/853 244/111 |
| 3,251,437 A | * | 5/1966 | Moyer .................... | F16D 55/40 188/264 AA |
| 3,664,467 A | * | 5/1972 | Lucien .................. | F16D 65/847 188/71.6 |
| 3,734,247 A | * | 5/1973 | Buckley ................ | F16D 65/847 188/264 A |
| 4,592,452 A | * | 6/1986 | Merle .................... | F16D 65/847 188/264 AA |
| 6,315,091 B1 | * | 11/2001 | Nilsen ................... | F16D 65/847 188/264 A |
| 6,357,563 B1 | * | 3/2002 | Hayford ................ | F16D 65/847 188/264 A |
| 7,963,376 B2 | * | 6/2011 | Gelb .................... | F16D 65/0031 188/264 AA |
| 8,448,753 B2 | * | 5/2013 | Petrini .................. | F16D 65/847 188/71.6 |
| 9,573,567 B2 | * | 2/2017 | Kirkbride ............. | F16D 65/847 |

(Continued)

*Primary Examiner* — Michael H Wang
(74) *Attorney, Agent, or Firm* — Haynes and Boone, LLP

(57) ABSTRACT

Systems and methods for aircraft brake cooling are described. A system may include an air hose configured to intake pressurized air at a first end of the air hose from an aircraft propulsor. A nozzle at a second end of the air hose may be configured to exit the pressurized air through the air hose to a braking system. An actuator may be configured to allow the pressurized air to flow through the air hose or prevent the pressurized air from flowing through the air hose.

20 Claims, 5 Drawing Sheets

(56) References Cited

U.S. PATENT DOCUMENTS

| | | | |
|---|---|---|---|
| 10,597,148 B2* | 3/2020 | Meinel Cheesman | B64C 25/42 |
| 2019/0219118 A1* | 7/2019 | Jeffery | F16D 65/853 |
| 2019/0301554 A1* | 10/2019 | Hosamane | F16D 65/847 |

* cited by examiner

AIRCRAFT BRAKE COOLING SYSTEMS AND METHODS

TECHNICAL FIELD

The disclosure relates generally to aircraft braking systems and, more specifically, to cooling for aircraft brakes.

BACKGROUND

Aircrafts typically land at speeds as high as 300 kilometers per hour (kph). Typical aircraft runways have a limited amount of distance and the limited distances of existing runways impose severe performance requirements on aircraft brakes.

Once an aircraft has touched down, friction brakes are used to slow down the aircraft and allow it to come to a complete stop. Friction brake systems decelerate vehicles by converting at least partially forward momentum to heat. As aircraft weight is typically very high, aircraft friction braking systems often lead to high brake temperatures, which can cause high wear of brake rotors and pads as well as degraded performance.

Furthermore, once stopped, the rotors and pads typically require a significant amount of time to cool. Take off may be delayed until brakes are sufficiently cooled. Thus, high brake temperatures can increase turnaround time for flights.

SUMMARY

Systems and methods are disclosed for aircraft brake cooling are described. According to an example of the disclosure, a system is described comprising an air hose configured to intake pressurized air at a first end of the air hose from an aircraft propulsor; a nozzle at a second end of the air hose and configured to exit the pressurized air through the air hose to a braking system; and an actuator configured to allow the pressurized air to flow through the air hose or prevent the pressurized air from flowing through the air hose.

According another example of the present disclosure, an aircraft comprising a landing gear assembly, having a braking system and a wheel assembly is described.

According to yet another example of the present disclosure, a method is described comprising capturing pressurized air from an aircraft propulsor; flowing the pressurized air to a braking system; and applying the pressurized air to the braking system, thus removing heat generated from brake application with the applied pressurized air.

The scope of the invention is defined by the claims, which are incorporated into this section by reference. A more complete understanding of the disclosure will be afforded to those skilled in the art, as well as a realization of additional advantages thereof, by a consideration of the following detailed description of one or more implementations. Reference will be made to the appended sheets of drawings that will first be described briefly.

BRIEF DESCRIPTION OF THE DRAWINGS

Examples of the disclosure and their advantages are best understood by referring to the detailed description that follows. It should be appreciated that like reference numerals are used to identify like elements illustrated in one or more of the figures.

DETAILED DESCRIPTION

Figure 1:
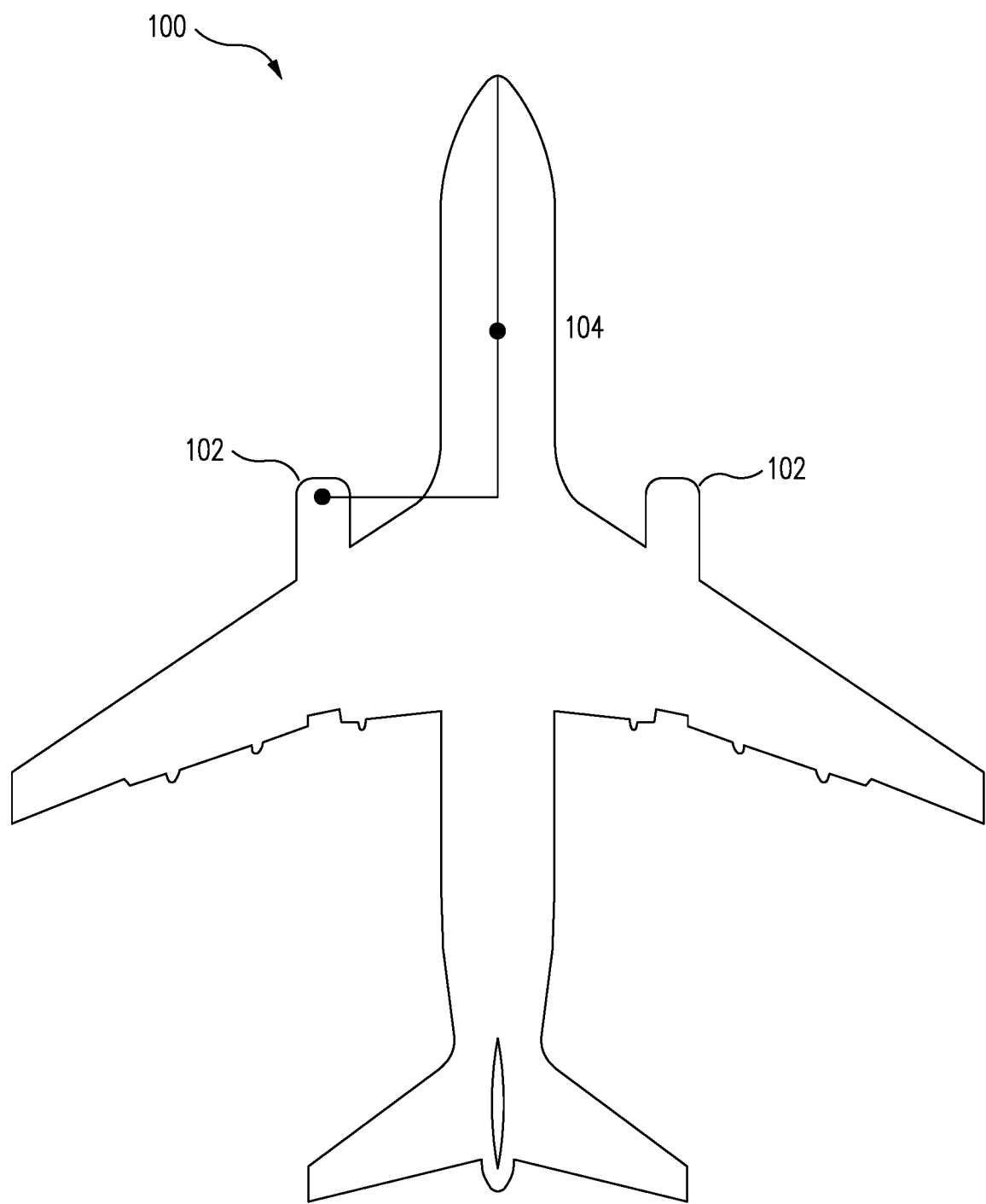
FIG. 1 illustrates a representation of an aircraft in accordance with examples of the disclosure.

Various examples of systems and techniques for aircraft brake cooling are described herein. The systems can include an intake disposed within an aircraft propulsor. The intake can be actuated between an open position allowing air to flow into an air hose and an off position preventing air from flowing into the air hose. The air hose can be routed through the aircraft to allow air to flow from the aircraft propulsor to the brakes of the aircraft. The air can exit the air hose through one or more nozzles. The nozzles can direct exiting air to surfaces or channels (e.g., cooling vane channels) of brake pads and/or brake rotors to cool the brake pads and/or brake rotors.

Existing solutions can utilize a fan blower within the wheel assembly of the aircraft to blow air onto the brakes of the aircraft. As the fan blower is electrically driven and uses batteries as a power source, the fan blower increases aircraft costs and increases aircraft weight and unsprung weight due to the fan blower and the heavy battery. Furthermore, fan blowers do not provide sufficient pressure to adequately cool the brakes in a short amount of time and generates heat itself when in operation.

By contrast, the systems and techniques described herein allow for a bypass line from the aircraft propulsor to the brakes of the aircraft to cool the brakes. Such systems and techniques are less complicated, lighter, can generate a higher amount of air pressure (e.g., 12 bars of pressure) leading to a greater volume of airflow onto the brakes and cooler brakes, do not generate additional waste heat, and have a much longer operational life as the system is not dependent on battery life. The resulting cooler brakes increase rotor and pad life and, thus, decrease service requirements of aircraft. Furthermore, the time to cool the brakes to a temperature acceptable for takeoff can be decreased, leading to a higher frequency of flights.

In certain examples, the opening and closing of the intake can be through solenoid operation. The opening and closing of the intake can be controlled manually by an operator (e.g., a pilot) and/or controlled automatically by a programmed controller (e.g., a logic controller) and/or microcontroller of the aircraft. For example, the controller can determine when an aircraft has touched down or when the brakes of an aircraft are applied and open the intake for extra cooling.

Jet aircraft commonly use carbon-carbon brakes. Carbon-carbon brakes generally operate best at temperatures higher than ambient (e.g., above 400 degrees Celsius). Thus, in certain examples such as for use with carbon-carbon brakes, the controller can open the intake after a delay. The delay allows for the brakes to warm up to operating temperature without cooling airflow (which can increase warm up time). In certain other examples, one or more sensors (e.g., thermal sensors) can be disposed at or near the brakes to determine the temperature of the brakes of the aircraft. The intake can be held closed until the temperature of the brakes rise above a set threshold temperature. The intake can then open to allow cooling airflow to the brakes to prevent the brakes from overheating. In such examples, when the temperature of the brakes fall below another set threshold temperature, the intakes can close to stop the cooling airflow. In other examples, the intakes can close after a set amount of time has elapsed after opening.

FIG. 1 illustrates a representation of an aircraft 100 in accordance with examples of the disclosure. The aircraft 100 comprises one or more engines 102 and landing gears 104. In some examples, the engines 102 may be turbofan engines. The aircraft illustrated in the example of FIG. 1 has two turbofan engines 102, and three landing gears (e.g., two main landing gears and a nose landing gear).

In one example, a bypass line may provide the cooling air from one or more of the engines 102 to one or more of the landing gears 104. For example, an air hose may be provided along the aircraft to intake pressurized air from an exhaust of the engine 102 and routed to a braking system of the landing gear 104 as cooling air.

Figure 2:
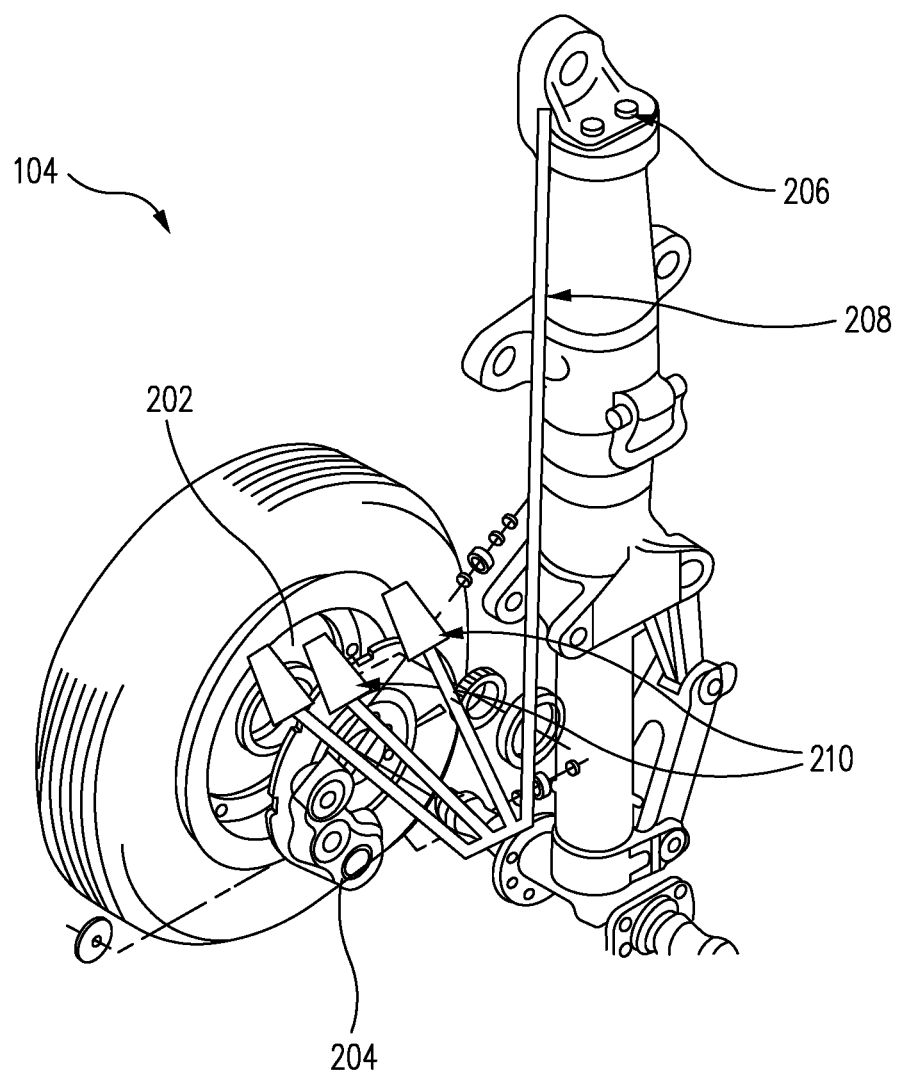
FIG. 2 illustrates a perspective view of an aircraft landing gear with a braking system in accordance with an example of the disclosure.

FIG. 2 illustrates a perspective view of an aircraft landing gear 104 with a braking system in accordance with an example of the disclosure. As described, a first end of the air hose 208 may be configured to intake pressured air from the engine 102. One or more nozzles 210 may be coupled to a second end of the air hose 208 and the nozzles 210 may be disposed at or within the braking system such that the pressurized air from the engine exhaust is blown at the braking system.

In some examples, the braking system includes at least a brake rotor 202 and a brake pad 204. When the brakes are engaged, the rotor 202 and the pad 204 come in contact with each other and the friction between the two generates heat. According to an example of the present disclosure, the nozzles 210 may be positioned such that the pressurized air is applied to the brake rotor 202 and/or the brake pad 204. In some examples, the pressurized air is applied to other surface areas of the braking system that may become hotter during operation. As such, by applying the pressurized air throughout various areas of the braking system, the braking system may be cooled more rapidly than relying on unassisted heat dissipation.

In some examples, the air hose 208 may be series of metallic pipes (e.g., aluminum pipes) routed discretely throughout the aircraft and within the structures of the landing gear 104 from the engines 102 to the braking system. Yet in other examples, the air hose 208 may be a flexible hose such as, for example, rubber, polymer, or other flexible tube or pipe. The air hose 208 may be able to withstand the relatively high pressure of the pressurized air such as, for example 12 bars of pressure. It should be understood that the actual pressure of the air may be higher or lower than 12 bars.

In some examples, an actuator 206 is provided with the air hose 208 to open the intake and allow the pressurized air to flow from the engine 102 to the braking system or to close the intake and prevent the pressurized air from flowing from the engine 102 to the braking system. In some examples, the actuator 206 may be a solenoid actuator disposed on or within the landing gear 104. Yet in other examples, the actuator 206 may be a hydraulic actuator or a pneumatic actuator. The actuator 206 may be engaged by an operator (e.g., a pilot) or by an electronic controller and/or a microprocessor programmed according to set criteria, which will be described in more detail with reference to FIG. 5.

Figure 3:
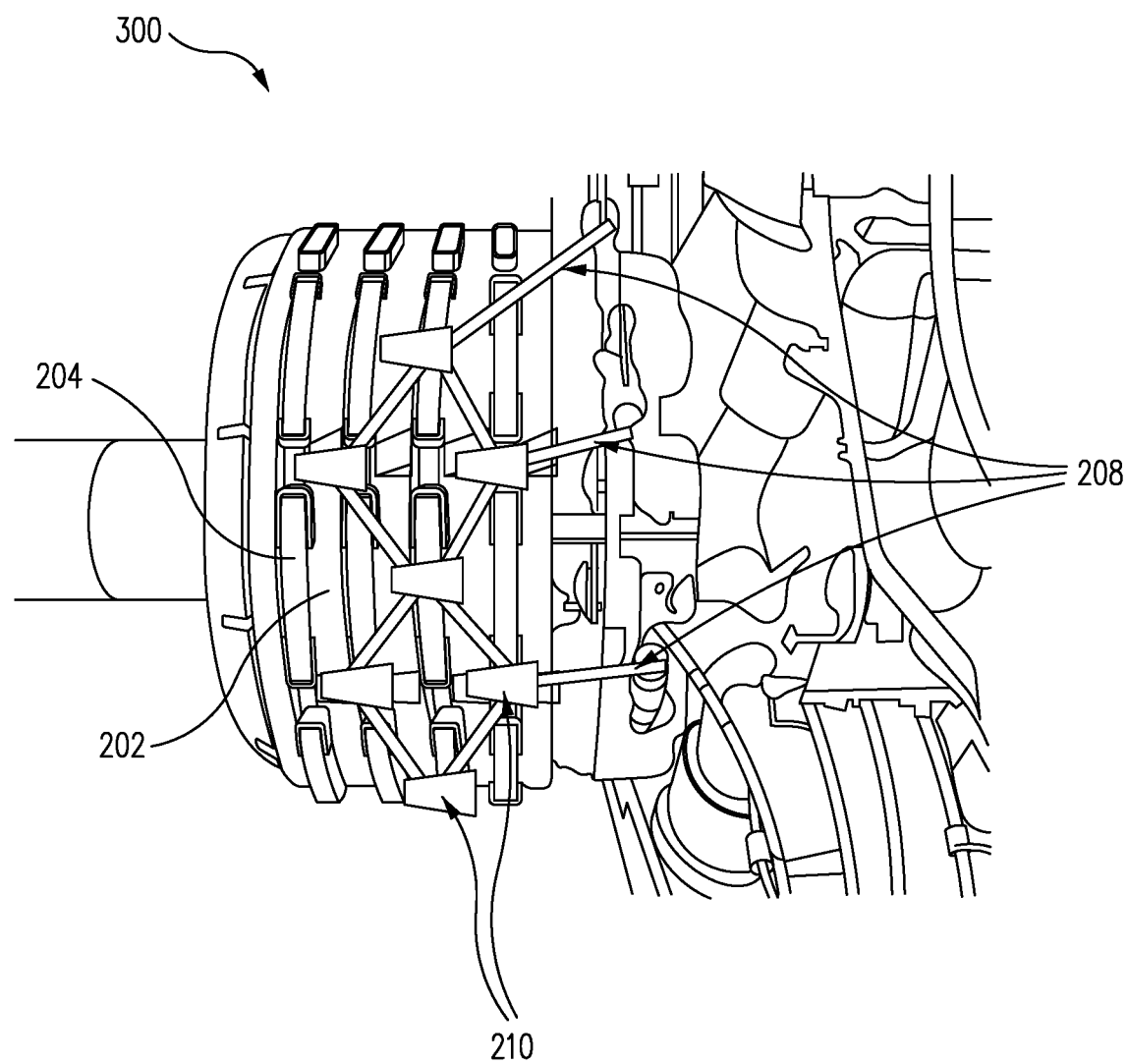
FIG. 3 illustrates a front view of an aircraft braking system in accordance with an example of the disclosure.

FIG. 3 illustrates a front view of an aircraft braking system 300 in accordance with an example of the disclosure.

In some examples, the braking system 300 includes a plurality of brake rotors 202 and brake pads 204. Accordingly, the air hose 208 may be split into a plurality of air hoses, with each of the plurality of air hoses having an individual nozzle 210. The nozzles 210 may be positioned at each of the plurality of the brake pads 204 and/or at various locations along the brake rotor 202. In this manner, the pressurized air may be applied throughout the braking system 300, thus rapidly cooling the braking system 300.

In some examples where the aircraft has more than one engine 102 and/or more than one set of landing gear, the air hoses 208 may be cross-connected between all of the engines 102 and the landing gears to improve reliability of the brake cooling system by adding redundancy. For example, the air hoses 208 for the landing gear may be connected to both the left and right engines so that if one engine fails, the other engine will still be able to provide the pressurized air.

Figure 4:
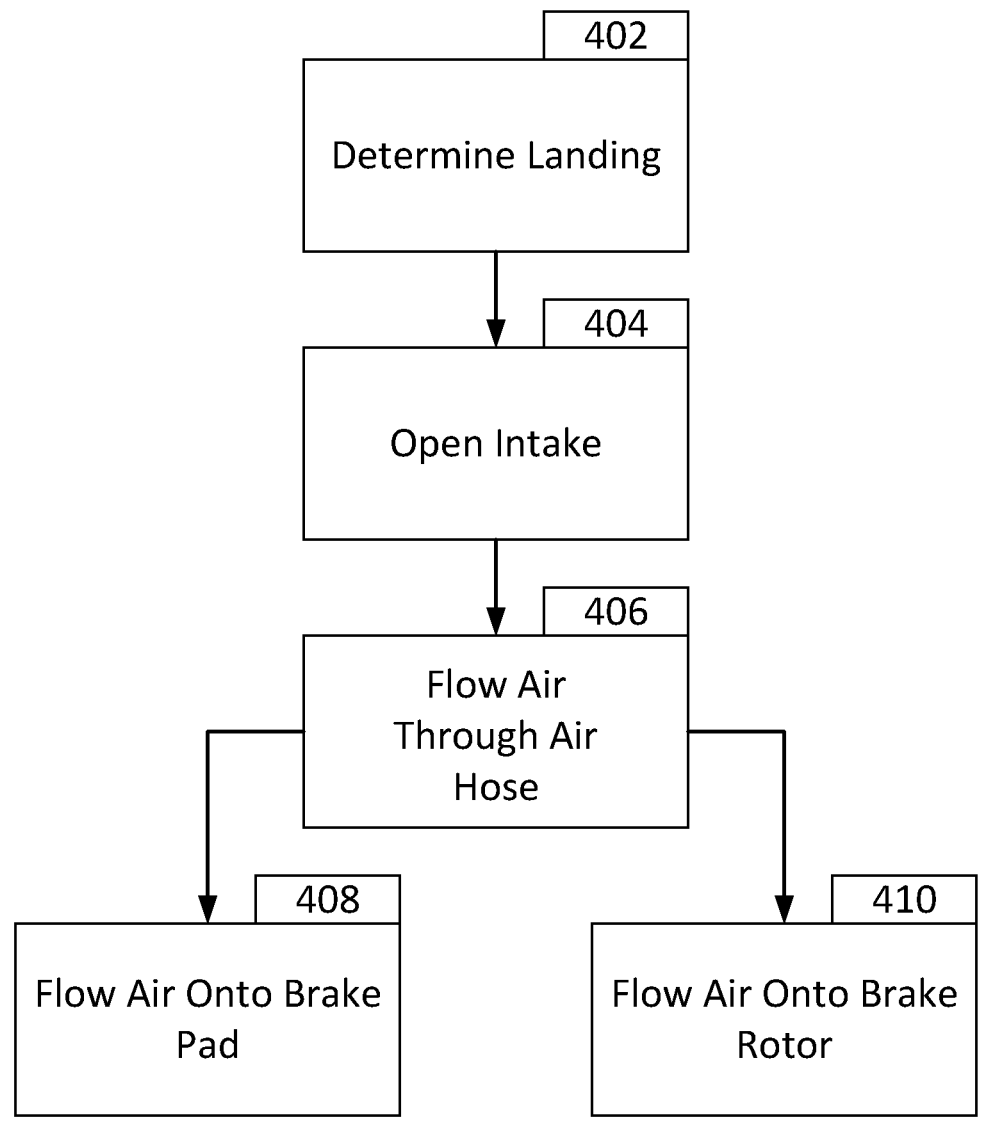
FIG. 4 is a flowchart detailing a technique of using the aircraft brake cooling system described herein in accordance with an example of the disclosure.

FIG. 4 is a flowchart detailing a technique of using the aircraft brake cooling system described herein in accordance with an example of the disclosure. At step 402, the pilot determines whether to use the brake cooling system for landing. If the brake cooling system is used for the landing, then when the actuator is operated, the intake is opened and the pressurized air from the engine is flowed, at step 406, toward the brakes. Then, the pressurized air from the engine exhaust will flow as cooling air to the brake pad and the brake rotor, steps 408, 410.

Figure 5:
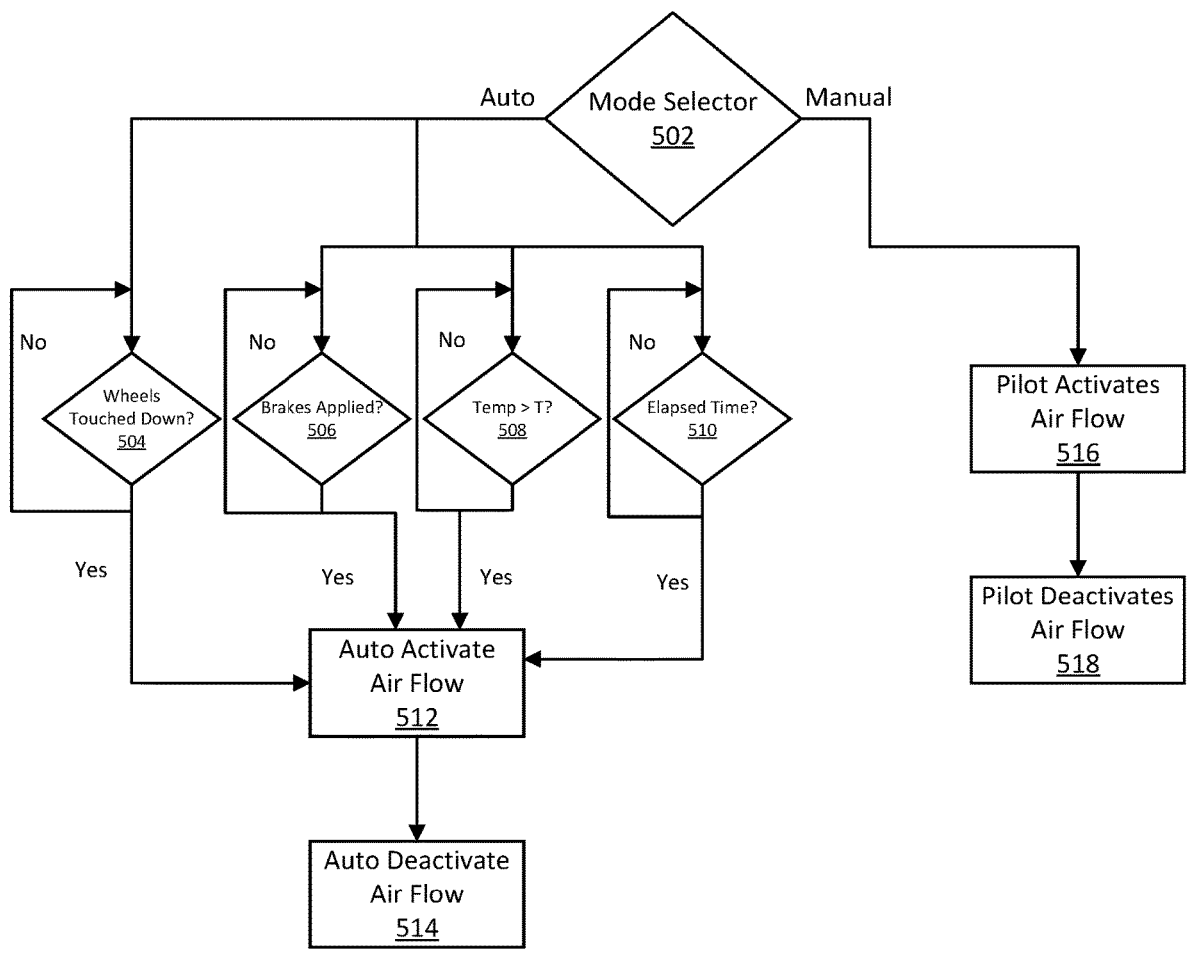
FIG. 5 is a flowchart detailing logic flow of the aircraft brake cooling system described herein in accordance with an example of the disclosure.

FIG. 5 is a flowchart further detailing logic flow of the aircraft brake cooling system described in accordance with an example of the disclosure. According to an example, an operator such as an aircraft pilot may determine at, step 502, whether to set the brake cooling system a manual mode or an automatic mode. In the automatic mode, a microcomputer or a controller of the brake cooling system may automatically determine when to apply the pressurized air to the braking system without operator input. For example, as the aircraft makes a final approach for landing, the braking system may have a sensor that can sense when the wheels of the aircraft touch the ground, thereby determining the moment that the aircraft touches down, at step 504. The sensor may be a motion sensor, a gyroscopic sensor, a load sensor, an acceleration sensor, and/or other sensors known in the art that indicate when the wheels touch the runway. Thus, when the brake cooling system determines that the wheel has touched down, the controller can automatically operate the actuator open the intake and to allow the pressurized air from the engines to flow through the air hoses and apply the pressurized air to the braking system, at step 512.

According to another example in the automatic mode, the microcomputer or the controller of the brake cooling system may operate the actuator when it senses that the brakes are applied. For example, the controller may receive an input signal from the braking system that the brakes are applied, at step 506. When the brake cooling system determines that the brakes are applied, the controller may automatically operate the actuator to open the intake and allow the pressurized air from the engines to flow through the air hoses and apply the pressurized air to the braking system, at 512.

According to yet another example in the automatic mode, the microcomputer or the controller of the brake cooling system may operate the actuator when it senses that the temperature of the braking system (e.g., the brake pads 204 or brake rotors 202) is higher than a set or predetermined threshold temperature (e.g., a programmed temperature), at step 508. When the brake cooling system determines that the braking system temperature is higher than the set temperature, the controller may automatically operate the actuator to open the intake and allow the pressurized air from the engines to flow through the air hoses and apply the pressurized air to the braking system, at step 512. In some examples, the thermal sensors may be mounted at or near the brake rotors and/or the brake pads.

According to yet another example in the automatic mode, the microcomputer or the controller of the brake cooling system may operate the actuator after a set or predetermined amount of time (e.g., a programmed amount of time) has elapsed after the brakes are applied, at step 510. The delay in applying the pressurized air allows for braking systems that operate better at higher ambient temperatures, e.g., carbon-carbon brakes, to warm up to an optimal operating temperature before attempting to cool the brakes. After the set amount of time has elapsed, the controller may automatically operate the actuator to open the intake and allow the pressurized air from the engines to flow through the air hoses and apply the pressurized air to the braking system, at 512.

Accordingly, the brake cooling system may be used to apply cooling air to the braking system automatically when certain conditions are satisfied as provided above. Additionally, the braking system may rely on a combination of the above described conditions. For example, in some examples, the pressurized air may be applied when brake cooling system determines both that the wheels have touched down and the brakes are applied. In other examples, the pressurized air may be applied when the brake cooling system determines that both the brakes are applied, and the temperature has risen above a set temperature. In this manner, the actuator opens the intake and allows the pressurized air to flow from the engines to the braking system. Moreover, the air flow is automatically stopped when the temperature of the braking system falls below a set or predetermined temperature and/or a set amount of time has elapsed at the air flow is applied, at step 514.

According to an example in the manual mode of operation of the braking system, an operator such as the aircraft pilot may manually operate the actuator to open the intake and allow the pressurized air to flow through the air hose and the nozzles, at step 516. The pilot may operate the actuator by a switch or a controller at the cockpit of the aircraft, for example, when the aircraft touches down. In some instances, the pilot may monitor the temperature of the braking system and operate the actuator when the temperature of the braking system rises above a certain temperature. Once the brake cooling system is activated, the pilot may operate the actuator to close the intake to stop the pressurized air from flowing at step 518, for example, when the temperature of the brakes fall below a certain temperature or when the brakes are no longer being applied.

As described, the brakes of an aircraft may be cooled more rapidly than by ambient dissipation by extracting pressurized air from the engine exhaust that already exists and using it as cooling air. In this manner, the brakes may be rapidly cooled without installing additional gear that adds additional weight and occupies space on the aircraft.

The examples provided above are described in detail with reference to the accompanying drawings. The present invention, however, may be embodied in various different forms, and should not be construed as being limited to only the illustrated examples herein. Rather, these examples are provided as examples so that this disclosure will be thorough and complete, and will fully convey the aspects and features of the present invention to those skilled in the art. Accordingly, processes, elements, and techniques that are not necessary to those having ordinary skill in the art for a complete understanding of the aspects and features of the present invention may not be described. In the drawings, the relative sizes of elements, layers, and regions may be exaggerated for clarity.

It will be understood that when an element or layer is referred to as being "on," "connected to," or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

The terminology used herein is for the purpose of describing particular examples and is not intended to be limiting of the present invention. As used herein, the singular forms "a" and "an" are intended to include the plural forms as well, unless the context clearly indicates otherwise. It will be further understood that the terms "comprises," "comprising," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

As used herein, the terms "substantially," "about," and similar terms are used as terms of approximation and not as terms of degree, and are intended to account for the inherent deviations in measured or calculated values that would be recognized by those of ordinary skill in the art. Further, the use of "may" when describing examples of the present disclosure refers to "one or more examples of the present disclosure." As used herein, the terms "use," "using," and "used" may be considered synonymous with the terms "utilize," "utilizing," and "utilized," respectively. Also, the term "exemplary" is intended to refer to an example or illustration.

The electronic or electric devices and/or any other relevant devices or components according to examples of the present invention described herein may be implemented utilizing any suitable hardware, firmware (e.g. an application-specific integrated circuit), software, or a combination of software, firmware, and/or hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the exemplary examples of the present invention.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

What is claimed is:

1. A system comprising:
    an air hose configured to intake pressurized air at a first end of the air hose from an aircraft propulsor;
    a nozzle at a second end of the air hose and configured to exit the pressurized air through the air hose to a braking system; and
    an actuator configured to allow the pressurized air to flow through the air hose or prevent the pressurized air from flowing through the air hose;
    wherein the actuator is configured to be actuated by a controller to allow the pressurized air to flow upon determining by the controller that each of one or more first conditions is satisfied, the one or more first conditions comprising a condition that a first predetermined amount of time has elapsed after an event which is at least one of: aircraft wheels touching down, and/or aircraft brakes being applied, wherein the first predetermined amount of time is sufficient to allow the brakes to warm up before the pressurized air is allowed to flow.

2. The system of claim 1, wherein the braking system comprises a brake rotor and a brake pad, and the nozzle is positioned to apply the pressurized air to the brake rotor and/or the brake pad.

3. The system of claim 1, wherein the aircraft propulsor is a turbofan engine.

4. The system of claim 1, wherein the pressurized air is obtained from a bypass line of the aircraft propulsor.

5. The system of claim 1, further comprising an aircraft landing gear, the landing gear comprising the braking system and the actuator.

6. The system of claim 1, wherein the event is the brakes being applied, and the first predetermined amount of time is sufficient to allow the brakes to reach a predetermined optimal operating temperature.

7. The system of claim 6, wherein the brakes are carbon-to-carbon brakes, and the predetermined optimal operating temperature is 400° C.

8. The system of claim 1, wherein the controller is configured to operate the actuator to prevent the pressurized air from flowing upon determining by the controller that each of one or more second conditions is satisfied, the one or more second conditions comprising a condition that a second predetermined amount of time has elapsed after the actuator allowing the pressurized air to flow.

9. The system of claim 1, wherein the event is the aircraft wheels touching down.

10. The system of claim 1, wherein the event is the aircraft brakes being applied.

11. The system of claim 1, wherein the one or more first conditions comprise a condition that a temperature of the braking system exceeds a set temperature.

12. An aircraft comprising the system of claim 1, the aircraft comprising a landing gear assembly, the landing gear assembly comprising:
    the braking system; and
    a wheel assembly.

13. The system of claim 1, wherein the actuator is a solenoid actuator.

14. A method comprising:
    capturing pressurized air from an aircraft propulsor;
    flowing the pressurized air to a braking system; and
    applying the pressurized air to the braking system, thus removing heat generated from brake application with the applied pressurized air;
    wherein the pressurized air is allowed to flow by a controller upon determining that each of one or more first conditions is satisfied, the one or more first conditions comprising a condition that a first predetermined amount of time has elapsed after an event which is at least one of: aircraft wheels touching down, and/or aircraft brakes being applied, wherein the first predetermined amount of time allows the brakes to warm up before the pressurized air is allowed to flow.

15. The method of claim 14, wherein the event is the aircraft wheels touching down.

16. The method of claim 14, wherein the event is the aircraft brakes being applied.

17. The method of claim 14, wherein the one or more first conditions comprise a condition that a temperature of the braking system exceed a set temperature.

18. The method of claim 14, wherein the brakes are carbon-to-carbon brakes, and the brakes warm up to at least 400° C. during the first predetermined amount of time.

19. The method of claim 14, wherein the braking system comprises a brake rotor and a brake pad, wherein the pressurized air is applied to the brake rotor and the brake pad.

20. The method of claim 14, further comprising stopping the pressurized air flow upon determining by the controller that each of one or more second conditions is satisfied, the one or more second conditions comprising a condition that a second predetermined amount of time has elapsed after allowing the pressurized air to flow.

* * * * *